(12) United States Patent
Draim

(10) Patent No.: US 6,227,497 B1
(45) Date of Patent: May 8, 2001

(54) ADAPTIVELY POSITIONED SOLAR ARRAY

(75) Inventor: John E. Draim, Vienna, VA (US)

(73) Assignee: Mobile Communications Holdings, Inc., Washington, DC (US)

( * ) Notice: Subject to any disclaimer, the term of this patent is extended or adjusted under 35 U.S.C. 154(b) by 0 days.

(21) Appl. No.: 09/378,564

(22) Filed: Aug. 19, 1999

Related U.S. Application Data

(60) Provisional application No. 60/097,132, filed on Aug. 19, 1998.

(51) Int. Cl.[7] ....................................................... B64G 1/44
(52) U.S. Cl. ........................................ 244/173; 244/158 R
(58) Field of Search ................................... 244/171, 173, 244/158 R, 168, 164; 136/292

(56) References Cited

U.S. PATENT DOCUMENTS

| 4,426,052 | * | 1/1984 | Hubert et al. . |
| 4,728,061 | * | 3/1988 | Johnson et al. . |
| 5,133,518 | * | 7/1992 | Flament . |
| 5,257,759 | * | 11/1993 | Bender . |
| 5,653,407 | * | 8/1997 | Bertheux et al. . |
| 5,687,084 | * | 11/1997 | Wertz . |
| 5,687,933 | * | 11/1997 | Goodzeit et al. . |
| 5,716,031 | * | 2/1998 | Duchon . |
| 5,794,891 | * | 8/1998 | Polle et al. . |

* cited by examiner

*Primary Examiner*—Peter M. Poon
*Assistant Examiner*—Tran Dinh
(74) *Attorney, Agent, or Firm*—Fish & Richardson P.C.

(57) ABSTRACT

Solar array with movable parts that are faced toward the sun during times of the orbit distant from the debris field. When the orbit is within the debris field, the panels are faced edge on to the direction of the orbit.

5 Claims, 7 Drawing Sheets

ADAPTIVELY POSITIONED SOLAR ARRAY

CROSS REFERENCE TO RELATED APPLICATIONS

This application claims the benefit of the U.S. Provisional Application No. 60/097,132, filed Aug. 19, 1998.

BACKGROUND OF THE INVENTION

Satellites often use arrays of solar cells in order to supplement their power system. For best results, these solar cells should be pointed toward the sun.

SUMMARY OF THE INVENTION

The present system recognizes that in a variable height orbit, such as an elliptical orbit, the satellite will encounter differing, and sometimes degrading, space environments. The degrading effects of atmospheric drag and impacts by debris particles can greatly effect the lower, near-earth, region of the orbit. Therefore, a disclosed mode orients the solar cells to face toward the sun only during certain portions of the orbit, and in a way that simultaneously alleviates many of the debilitating effects from these factors.

In a disclosed mode, an elliptical orbit is used. At the apogee of this elliptical orbit, the satellites are oriented with their solar cells facing toward the sun. However, when the satellite reaches the perigee portion of its orbit, it eventually reaches a point where it enters either the so-called debris field of the Earth, or the atmosphere of the Earth. In all of these cases, orienting the solar cells to face toward the sun can cause a problem. In the debris field, this orientation can orient the solar cells to point its maximum possible surface area toward the debris field. This increases the chances of being hit by a piece of debris.

In the atmosphere, orientation of the solar cell in this way can increase the atmospheric drag, and possibly provide the need for supplemental thrusters to maintain the movement and inertia of the satellite.

Having made these recognitions, the present system determines when the satellite enters at least one of the debris fields and/or the atmospheric field of the Earth. At that point, the satellite changes its orientation to provide minimum surface area in the direction of the rotation of the satellite.

BRIEF DESCRIPTION OF THE DRAWINGS

These and other aspects will be described in detail with reference to the accompanying drawings, wherein.

The following

DESCRIPTION OF THE PREFERRED EMBODIMENTS

Figure 1:
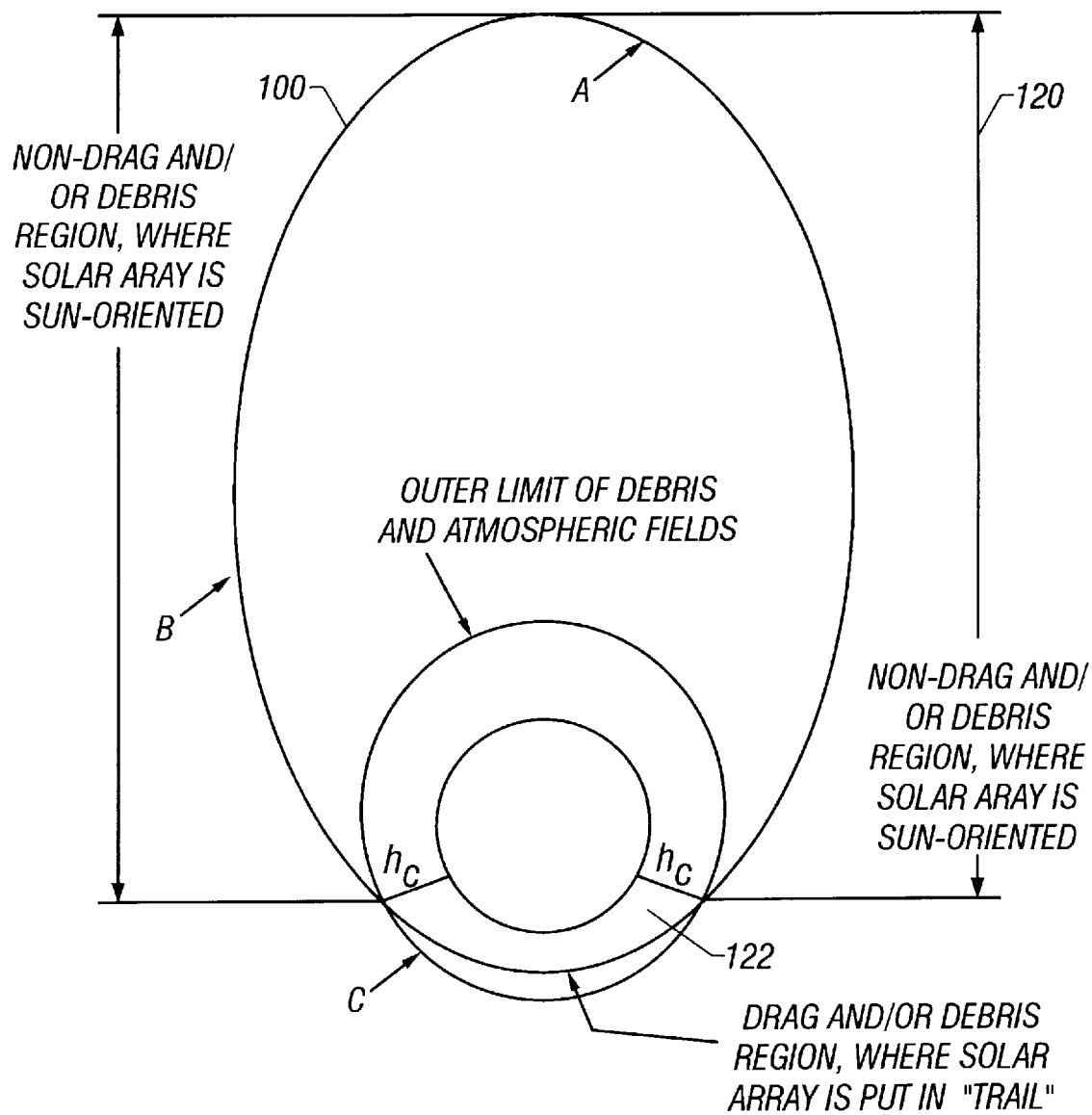
FIG. 1 shows a satellite in an elliptical orbit at three different points during its rotation.

FIG. 1 shows a satellite in an elliptical orbit around the Earth, with the Earth at one focus of the ellipse. The satellite orbit 100 is shown relative to the earth. The portions A, B, and C respectively represent portions near apogee, a portion out of apogee, but before contacting the debris field or the atmospheric field, and a portion C during the perigee portion of the orbit, in which the satellite is within the atmospheric field or debris field.

Significant advantages can be obtained from reducing the atmospheric and/or debris drag. This can result in a somewhat lighter satellite with a longer lifetime, since the satellite will require less on-board maneuvering fuel for drag make-up. Reducing the aspect of the solar array to the approaching field of orbital debris particles can also reduce the broadside area of exposure and directly and proportionately reduce the probability of a high-velocity impact that could greatly reduce or even eliminate the ability to generate electrical power. This second advantage can also translate into a longer lifetime satellite with obvious economic advantages to the satellite operator.

These features can be obtained by the disclosed system that places the solar array in a "trail" position; this may be viewed as orienting the solar array to slice through the atmosphere and debris fields "edge-on" with the minimum exposed area.

Effectively these form a non-drag and/or non-debris region 120 of satellite orbit in which the satellite's solar array is continuously sun-oriented, i.e., oriented perpendicular to the sun line. This broadside aspect exposes the maximum cross section to the sun's rays and represents the most efficient and productive means for the generation of electrical power.

The drag region 122 of the orbit occurs at lower satellite altitudes above the earth, at and near the satellite's perigee point. In this region, the solar array aspect will be re-oriented to place the solar array edge-on to the approaching atmosphere and debris particles. Both the orbital debris field and the atmospheric field of the earth are most concentrated at relatively low altitudes, and thus are somewhat coincident. The particular critical altitude, or hC, that defines the separation points between the two regions can be specified by the satellite operator to encompass the atmosphere surrounding the earth, the altitude limit of the earth's orbital debris field, or any altitude in between that represents a useful compromise considering all other factors and the degree of risk the operator feels willing and able to accept.

Figure 5:
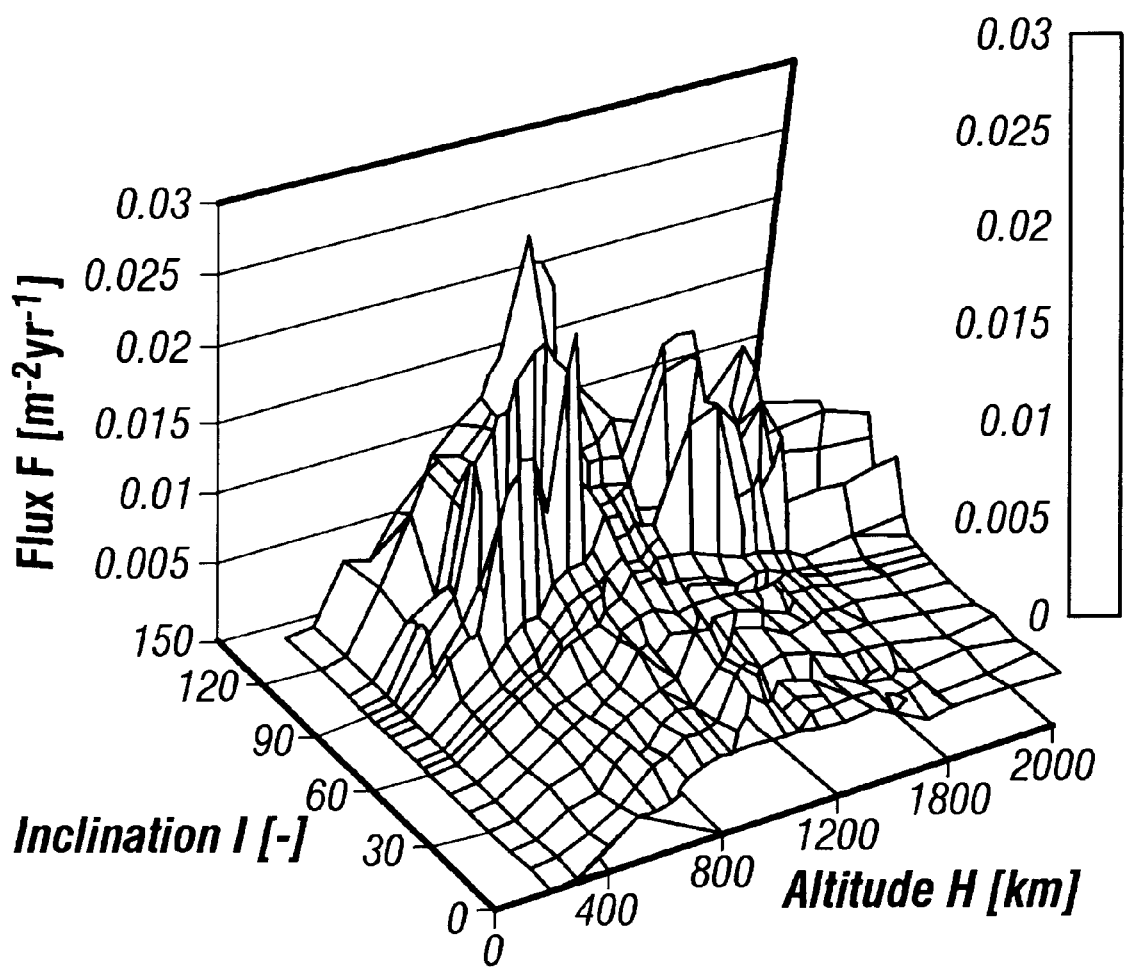
FIG. 5 shows distribution of debris.

The debris field typically extends out as far as 2500 kilometers. More details on the debris field is shown in FIG. 5 and its accompanying description.

When at the desired altitude, i.e., within the debris field and/or the atmosphere, the satellite turns itself edge on to the direction of the orbit, to present the least possible drag/resistance to the debris field.

Figure 2:
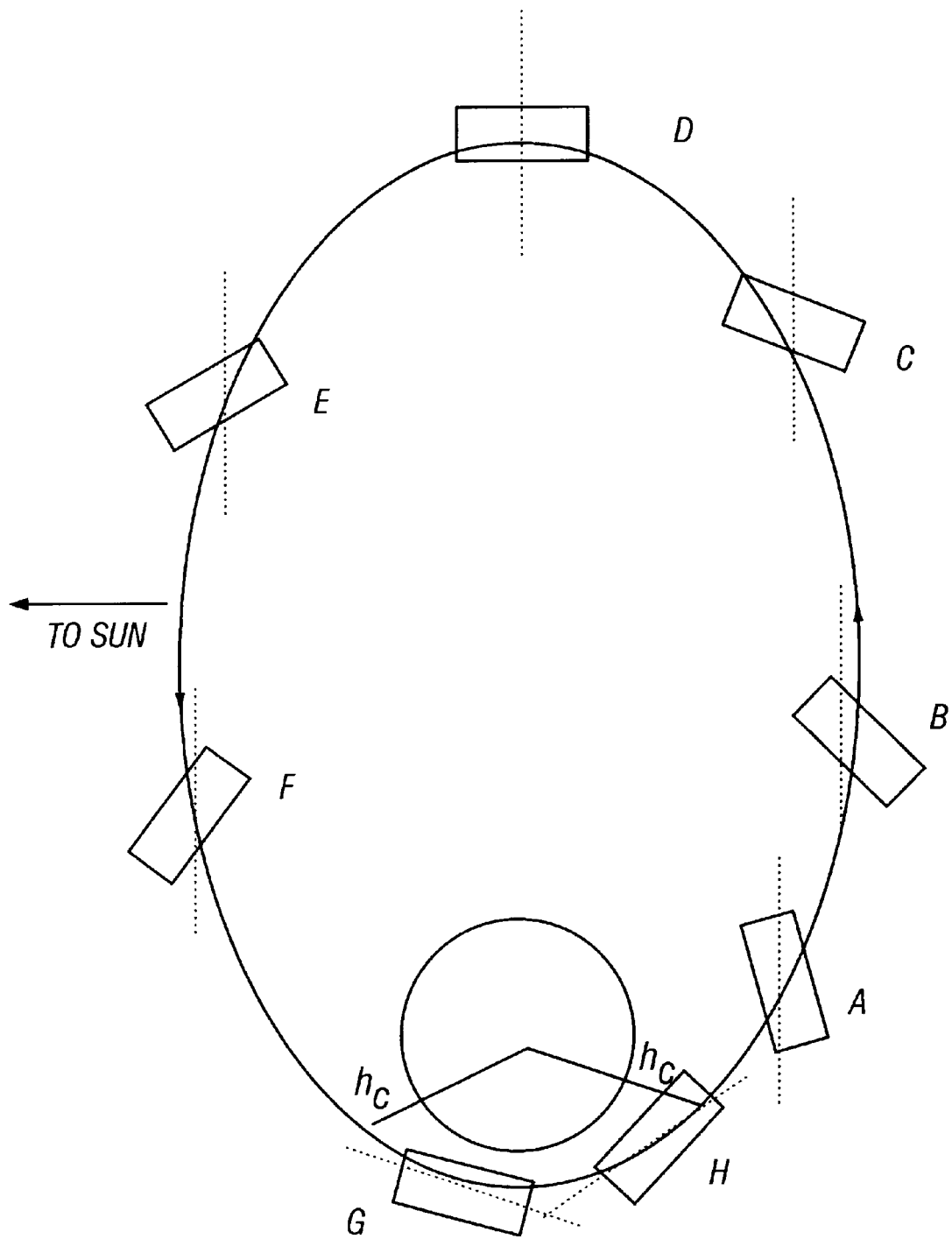
FIG. 2 shows an elliptical orbit showing solar array orientations.

FIG. 2 shows the actual orientation of both the communication satellite and the solar arrays that are attached to the satellite in the different orbital regions. In both regions, the satellite body is oriented so that its nadir-facing surface, containing the earth oriented antennas, points towards the center of the earth. The solar array is mounted in a gimballed arrangement so that it can continuously be re-oriented with respect to the satellite body. This allows the satellite to be pointed broadside to the sun. In the non-critical region, this orientation broadside to the sun represents the most efficient pointing angle possible for the maximum absorption of the sun's energy. Another way of describing this orientation is to state that the normal to the plane of the solar array will be parallel to the sun-earth line. In the critical region, for the reasons stated before, the solar array will be re-oriented to the edge-on, or "trail" position.

Yet another way of stating this is that the velocity vector, or equivalently the tangent to the orbit track, will be in the plane of the solar array. The satellite is oriented so that its solar cells face the sun and edges of the solar cells face away from a path of the orbit when it is at a height not likely to interfere, and edges of the solar cells face in the direction of the orbit when it is detected to interfere.

Figure 7:
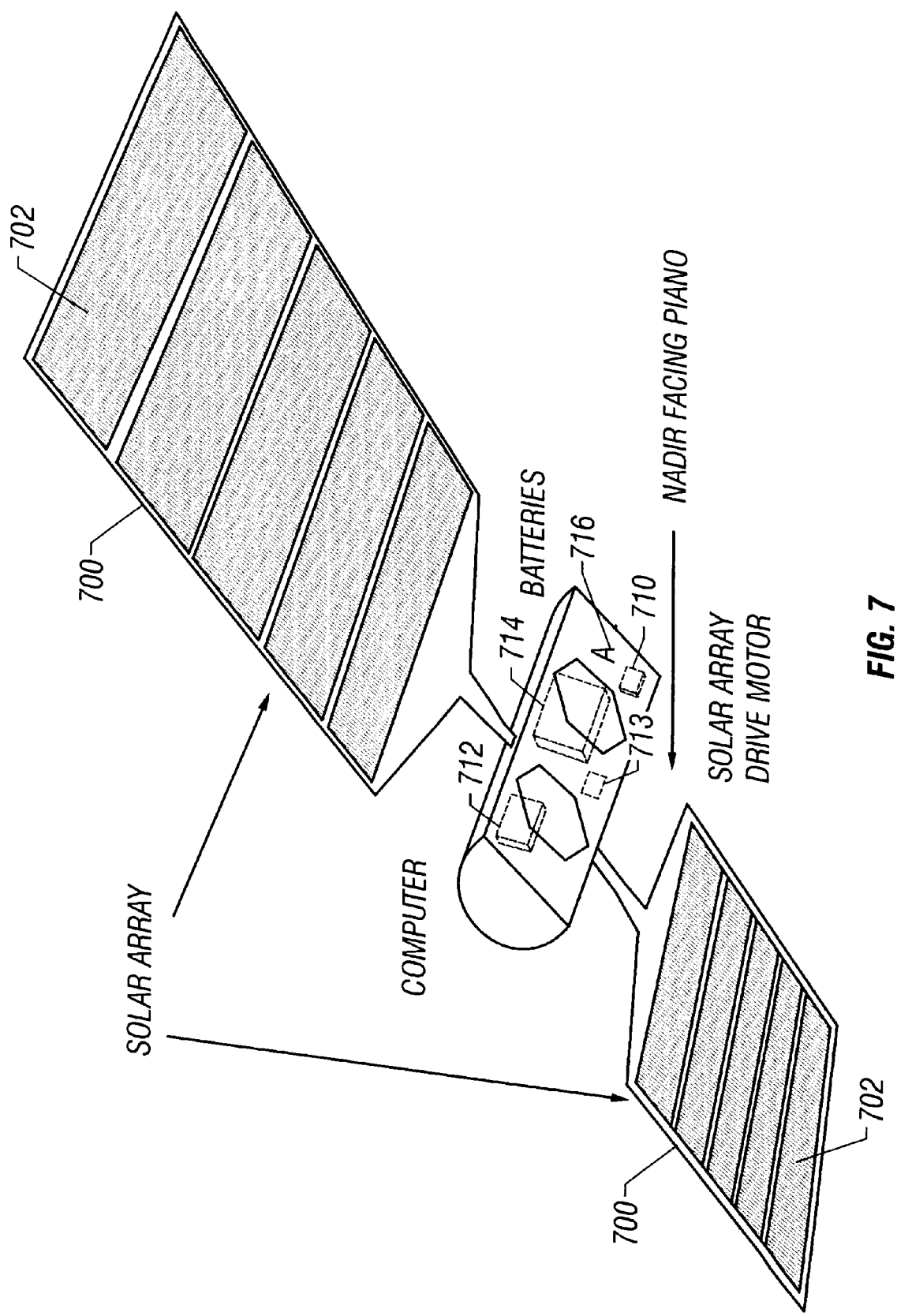
FIG. 7 shows a cutaway view of a satellite.

A block diagram of the satellite itself is shown in FIG. 7. The solar array 700 typically extends over a much larger area than the satellite. The front surface 702 of the solar array includes the solar cells and includes much more surface area than the edge surface 704 of the solar array. A communicating device 710 communicates with a point on the Earth 110 in operation. The operation of the satellite is controlled by processor 712 which carries out various operations based on a stored program. The programming of such satellites is well known. The moving features described above is implemented within the satellite's on-board computer and the solar array drive motor 713 (that is commonly driven electrically). The satellite's computer can easily determine when it is in the critical altitude range that will exist from perigee altitude up to the limit of the atmosphere and or the orbital debris field, or both. Due to the nature of the elliptical orbit, velocities at and near perigee are quite high relative to the rest of the orbit, so the percentage of time spent in the critical region is a fairly low percentage of the total time. Moreover, for many of the elliptical orbits in use, much or all of this critical region may occur on the eclipsed, or darkened side of the earth.

Although placing the solar array in the trail position rather than broadside to the sun would normally reduce the amount of electrical power that can be generated in full sunlight, the aspect of the same solar array during eclipse is largely irrelevant since little electrical power would be generated then, anyway.

A supplemental battery 714 provides supplemental power. The battery 714 can also include a generator, e.g., a nuclear generator. A thruster 716 provides supplemental thrusting force as necessary to make up for atmospheric drag.

Figure 3:
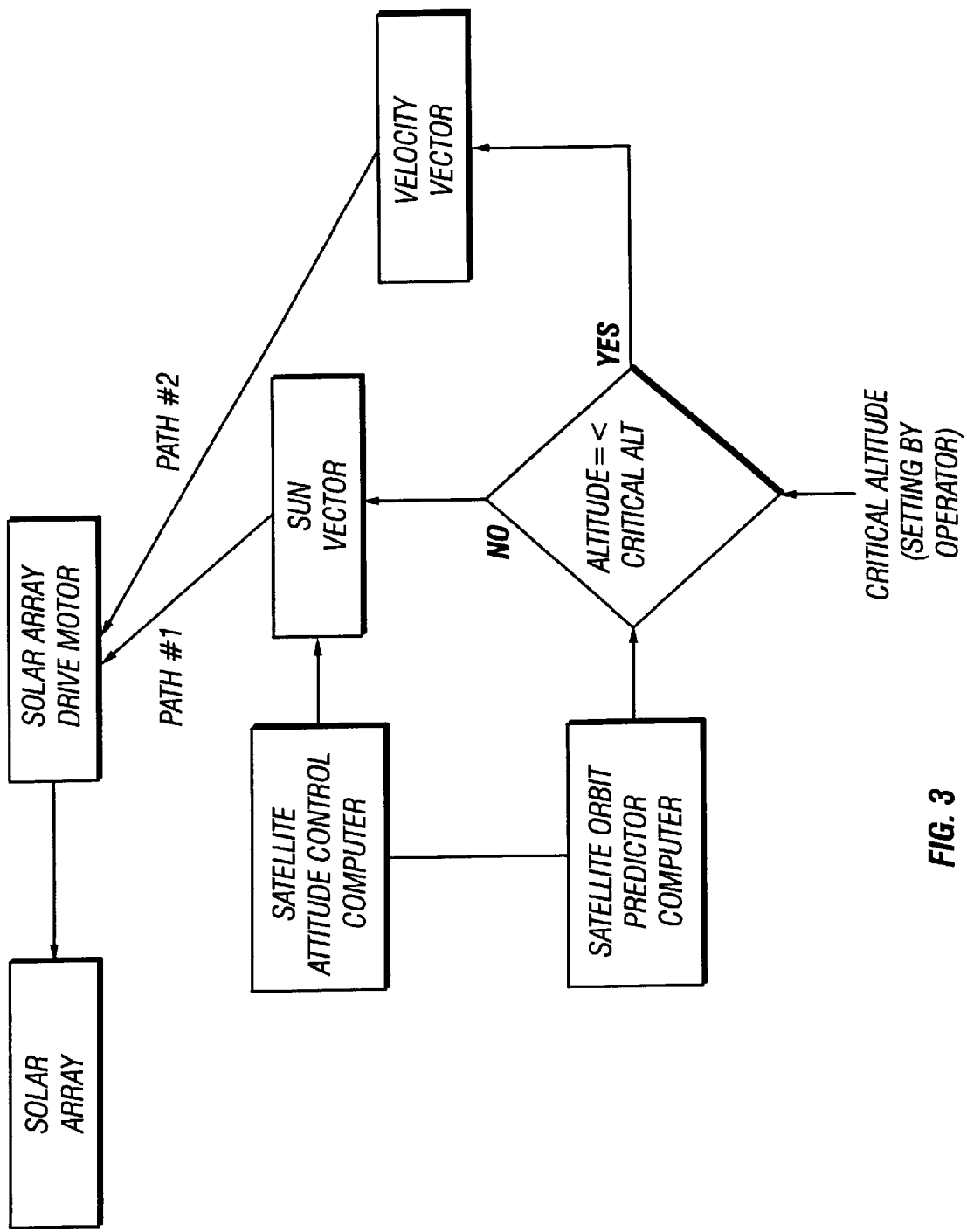
FIG. 3A shows a flow chart of operation of satellite movement.
FIG. 3B shows a solar array orienting system block diagram.

In operation, the processor executes a routine shown in FIG. 3A. The processor has pre-stored values indicating where in its orbit it actually is. At step 300, the system finds its position. The processor may do this at predetermined increments, e.g., every minute. At step 302, the processor determines if the current position is within the undesired area. This undesired area can be any user defined height, but is preferably within an altitude which places the satellite in at least one of the atmospheric fields or the debris field. If not, flow continues. If the satellite is within the undesired area, the thrusters are turned on at step 305 to orient the satellite edge onto the direction of rotation, i.e., so that the surface 204 faces in the direction of travel of the satellite. If the satellite is not within the desired area, a test is carried out at step 310 to determine if the satellite is currently edge on. If so, the satellite is reoriented to face the sun at step 312. Similarly, prior to turning on the thrusters, an additional step 304 determines if the satellite is already oriented edge on.

The present system determines when the satellite enters at least one and/or both of the said critical regions where atmospheric drag or orbital debris environments will occur. From then until the satellite exits the critical region, the satellite will use its on-board computational capability to send signals to the solar array that will align the said solar array parallel to the velocity vector (or orbital track). This will be referred to as the "trail" position. During all other times in the orbit, the solar array is aligned by the solar array drive motors to be positioned normal to the sun line (that is, broadside to the sun) for the purpose of absorbing the maximum amount of solar energy for electrical generation.

In operation, as shown in FIG. 3B, the satellite computer (orbit determination section) is continuously sampling the satellites altitude above the earth's surface. Likewise the computer is also accepting inputs on the satellite bus attitude, and commanding it through the bus satellite attitude control system to maintain the nadir face of the satellite constantly pointing towards the center of the earth. Typically, the above sampling occurs many times every second, so that any motion of either the satellite or the solar array between samplings is vanishingly small, and there is thus a smooth and steady motion in the orientation of both the satellite bus and the solar array. So long as the satellite is above the critical region where atmosphere and/or debris is present, the computer will command the solar array drive motor to maintain the solar array pointed at the sun. As soon as the computer senses when the satellite is equal or below the critical altitude, the computer sends a signal to the solar array drive motor to realign the solar array to the trail position, and continues to maintain this condition until the satellite rises in its orbit to an altitude just above the critical altitude that demarks the transition between the critical and the non-critical region. As soon as the satellite is in the non-critical region, the computer will return the solar array through the solar array drive motor to an orientation pointing to the sun.

FIG. 3B shows a method for orienting the solar array in both of the two regions described above. The satellite's attitude, or angular orientation in space is determined in its attitude control computer. The inputs to this computer are generally in the form of data from earth horizon sensors, star trackers, or combinations of the two. The satellite orbit predictor computer contains an updated listing of the orbital parameters, and from this data set and time (from the computer clock) the actual position and velocity values may be calculated. In point of fact, many satellites combine all computations within the confines of a single computer, or processor, so that the two computer functions described above could be performed by a single computer.

Knowing all the orbital parameters and the time, the satellite's altitude above the earth can be calculated. Thus, the computer can determine whether the satellite is in the critical, or in the non-critical region. If it is in the non-critical region (which it is most of the time), the attitude control computer drives the solar array motor to point the array at the sun, for maximum solar energy input). If the satellite is in the critical portion of its orbit, then the orbit predictor computer will compute the velocity vector, and command the solar array drive motor to align the solar array with this vector, thus placing the array in the low-drag, or trail position.

Figure 4:
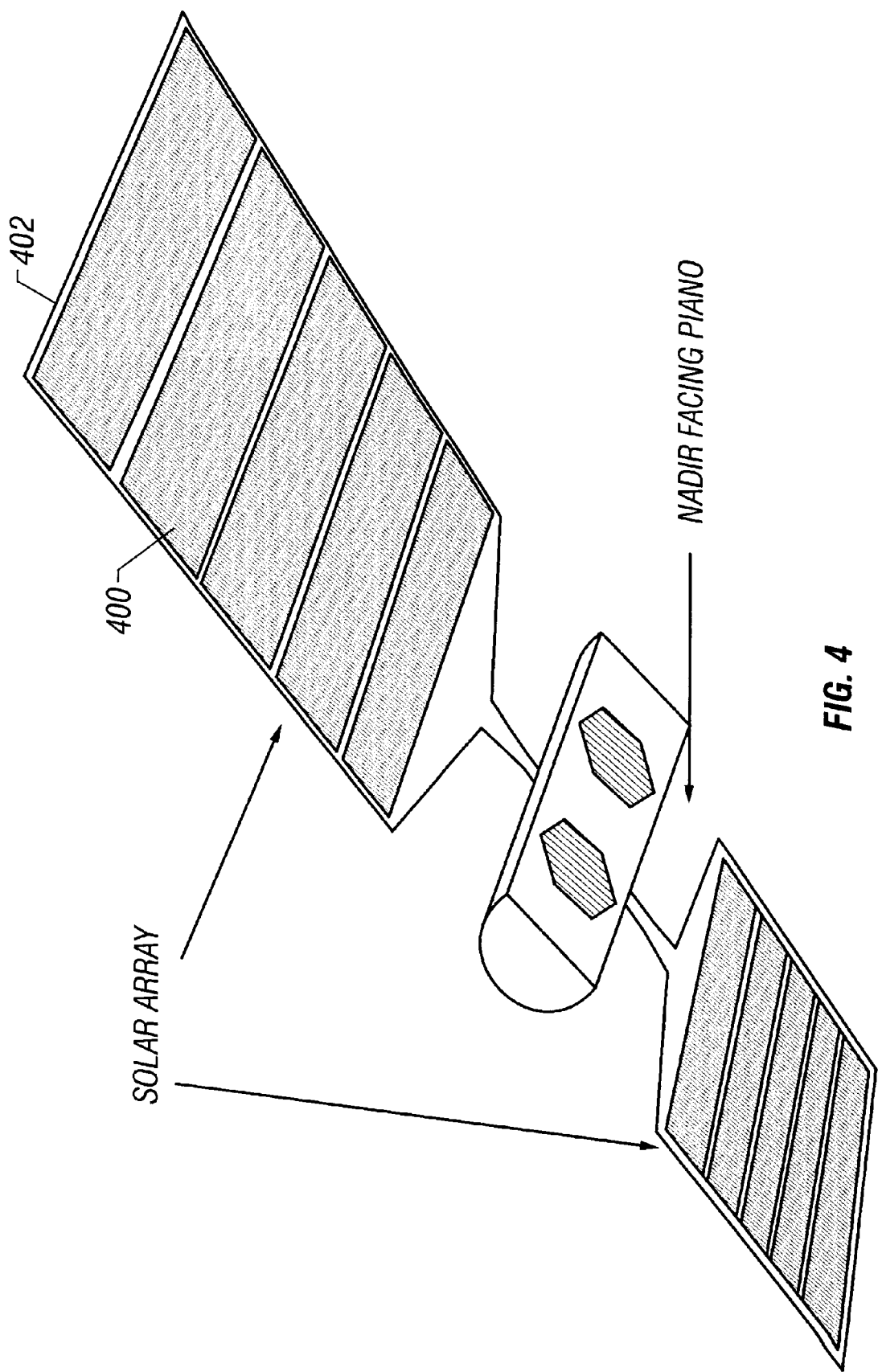
FIG. 4 shows a diagram of a communication satellite.

FIG. 4 shows a typical communication satellite. It can be seen that the broadside area 400 of the solar array is several times the size of the satellite body cross-section 402. Traveling broadside through the atmosphere or an orbital debris field enables the satellite to experience both a high drag (degrading the orbital trajectory) and a high exposure to approaching debris objects. The nadir face containing the earth pointing antennas is also evident in this figure.

FIG. 5 shows a typical distribution of debris particles, or debris flux as a function of orbit inclination, I, and mean altitude, H. Although orbital debris objects or particles, both natural and man-made, exist at virtually all altitudes, debris is much denser at low altitudes, near the earth. In fact, the preponderance of the orbital debris lies within approximately 2500 km altitude (above the earth's surface), as can be seen in FIG. 5.

Figure 6:
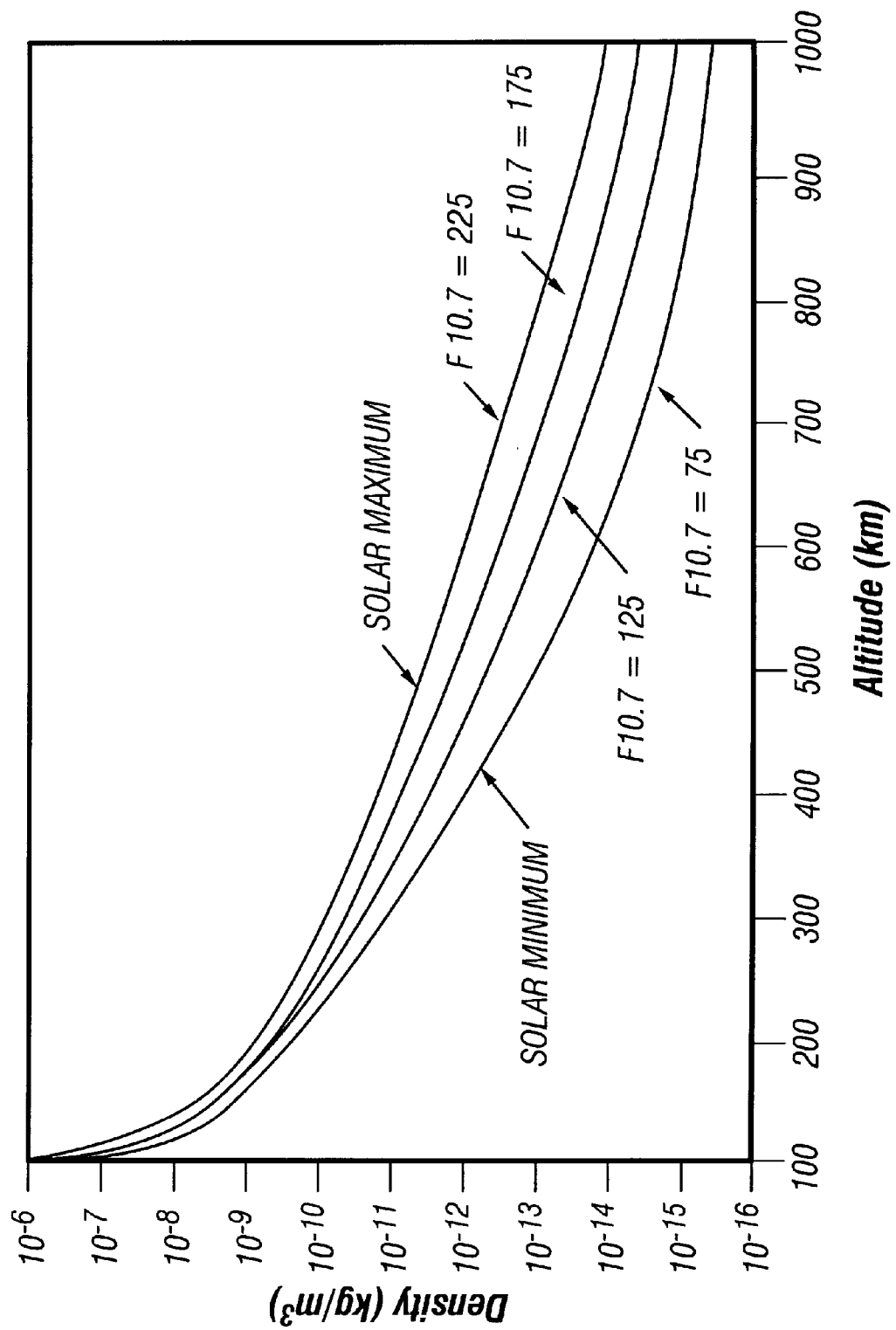
FIG. 6 shows an atmospheric density graph.

FIG. 6 shows a plot of atmospheric density versus altitude, for various phases from solar min to solar max during the roughly 11-year solar cycle. It can be seen that the density of the earth's atmosphere falls off exponentially with altitude, and the amount of drag above about 1000 km can be virtually discounted as a factor in degrading the orbit of the satellite.

FIG. 7 shows a cut-away cross-section of a typical (simplified) satellite as described above. The function of the solar array is to convert solar energy into electrical energy, which is then stored in a battery. This battery then furnishes prime power to perform all necessary functions pertaining to the satellite bus section (which comprises the power supply, the structure, the solar array, the solar array drive motor, maneuvering thrusters, thermal control devices, the satellite processor or computer, etc.) and the payload section (which comprises the primary mission or communications equipment, including receivers, antennas, transmitters, and the like). Fuel stored in the satellite is charged against the satellite bus, and satellite mass is frequently given as "Wet Mass"—with fuel; or "Dry Mass"—without fuel. Typically, only 25% or less of a given satellite mass is payload; with the preponderance being assigned to the satellite bus section.

Although only a few embodiments have been described in detail above, other embodiments are contemplated by the inventor and are intended to be encompassed within the following claims. In addition, other modifications are contemplated and are also intended to be covered. For example, while the embodiment described ellliptical orbits, any orbits with varying heights could alternately use this improvement.

What is claimed is:

1. A satellite system, comprising:

a satellite in an orbit that has varying orbital heights at different times, communicating with the Earth and including a control system therein, said control system detecting an orbital height of the satellite to determine if the orbital height is within a specified limit that indicates likely interaction with at least one of a debris field of the Earth or the atmosphere of the Earth, and orienting the satellite in a first way which faces its solar array toward the sun when the orbital height is not within the specified limit and in a second way wherein an edge of the solar array points in the direction of movement of the satellite to provide minimal surface area in the direction of movement when the orbital height is within the specified limit.

2. The system as in claim 1, wherein said portion is a solar array, further comprising a solar array drive motor, driving said solar array relative to said satellite.

3. The system as in claim 1, wherein said orbit is an elliptical orbit.

4. A method of operating a satellite comprising:

placing a satellite into an orbit which has varying orbital heights;

determining if the satellite is at a height in which it is likely to come into contact with at least one of a debris field of the Earth or the atmosphere of the Earth;

first orienting the satellite so that its solar cells face the sun and edges of the solar cells face away from a path of the orbit when it is at a height not likely to come into contact; and second orienting said solar cells such that said edges of the solar cells face in the direction of the orbit when it is detected to come into contact.

5. A method as in claim 4 further comprising using a computer to predict its position, and carrying out said first orienting and said second orienting based on said using.

* * * * *